United States Patent [19]

Benbassat

[11] Patent Number: 4,975,959
[45] Date of Patent: Dec. 4, 1990

[54] SPEAKER INDEPENDENT SPEECH RECOGNITION PROCESS

[75] Inventor: Gerard V. Benbassat, St. Paul, France

[73] Assignee: Texas Instruments Incorporated, Dallas, Tex.

[21] Appl. No.: 320,841

[22] Filed: Mar. 8, 1989

Related U.S. Application Data

[63] Continuation of Ser. No. 658,085, Oct. 5, 1984, abandoned.

[30] Foreign Application Priority Data

Nov. 8, 1983 [FR] France ............... 83 177738

[51] Int. Cl.$^5$ .................................. G10L 5/06
[52] U.S. Cl. ........................... 381/41; 381/43
[58] Field of Search .................. 381/41–43, 381/39, 48

[56] References Cited

U.S. PATENT DOCUMENTS

| | | | |
|---|---|---|---|
| 4,059,725 | 11/1977 | Sakoe | 381/43 |
| 4,394,538 | 7/1983 | Warren et al. | 381/43 |
| 4,467,437 | 8/1984 | Tsuruta et al. | 381/43 |
| 4,555,796 | 11/1985 | Sakoe | 381/43 |
| 4,590,605 | 5/1986 | Hataoka et al. | 381/43 |
| 4,592,085 | 5/1986 | Watari et al. | 381/43 |

OTHER PUBLICATIONS

"Interactive Clustering Techniques for Selecting Speaker Independent Reference Templates for Isolated Word Recognition", IEEE Transactions on Acoustics, Speech, and Signal Processing, vol. 27, No. 2, Apr. 1979, Stephen E. Levison et al.

"Nynamic Programming Algorithm Optimization for Spoken Word Recognition", IEEE Transactions on Acoustics, Speech, and Signal Processing, vol. AS-SP-26, No. 1, Feb. 1978, Hiroaki Sakoe and Seibi Chiba.

"Application de la Distinction Trait Indice Propriete a la Construction D'un Logiciel Pour la Synthese", Gerard Benbassat and Xavier Delon, Speech Communication 2, pp. 141–144 (Mar. 1983).

Primary Examiner—Gary V. Harkcom
Attorney, Agent, or Firm—William E. Hiller; N. Rhys Merrett; Melvin Sharp

[57] ABSTRACT

According to this process, a speech signal is analyzed in a vector quantizer (1) in which the acoustic parameters are calculated for each interval of time of a predetermined value and are compared with each spectral reference template contained in a reference template dictionary (2) utilizing a distance calculation. The sequence obtained at the output of the vector quantizer (1) is then compared with each of the words stored in a word lexicon (5) in a phonetic form utilizing phonetic distribution tables (3) associated with each template. A particular word of the speech to be recognized is then recognized as corresponding to a word stored in the lexicon having the maximum probability of its constituent phonetic units according to the phonetic distribution tables.

10 Claims, 5 Drawing Sheets

SPEAKER INDEPENDENT SPEECH RECOGNITION PROCESS

This application is a continuation, of application Ser. No. 06/658,085, filed 10-05-84, now abandoned.

This invention relates to speech recognition systems and more particularly to a device for recognizing speech independently of the speaker.

The problem of independent speech recognition speaker is one of the major problems to be resolved in the field of speech recognition.

The process of global recognition, which is very effective in recognizing words with speaker dependency, is a very ungainly solution as to the needed data processing systems when it is applied to speaker independent recognition techniques.

Indeed, it has been shown that about 10 templates per word to be recognized are needed to render the system speaker independent, (F. E. LEVENSON et al, "Interactive clustering techniques for selecting speaker independent reference templates for isolated word recognition" IEEE Trans. ASSP Vol. 27, No. 2 Apr. 1979).

This will already cause an increase of an order of magnitude in regard to the processing load and the random access memory RAM size, and, what is even more unfavorable, the templates must be obtained from a number of terms pronounced by a large number of carefully selected speakers.

This entails a very substantial memorization burden for each constituted vocabulary. This considerably limits the applications for such a system.

In addition, the analytical solution in which one attempts to convert the acoustic input into a sequence of phonetic units does not, as yet, yield a high level performance.

It is felt that the reasons for this are as follows:

In a number of projects, the analytical solution was utilized in the context of continuous speech recognition (L. D. ERMAN "A functional description of the HEARSAY II system" Proceeding 1977 IEEE Int. Conf. on ASSP, Hartford Ct, May 1977, pages 799 to 802. MERIER et al "KEAL: Un systeme pour le dialogue oral" Congress of the AFCET at Gif sur Yvette, 13-15 Nov. 1978, Vol. 2, pages 304-314).

Of course, this adds another level of difficulties.

A significant difficulty is the unlimited (or very large) vocabulary used, which requires a segmentation into phonetic units, and the errors made at this stage are very difficult to correct at a later stage of the procession.

For this reason, in accordance with one aspect of this invention, an analytic solution has been developed for even a limited number of words, in which the segmentation for each vocabulary word can be effected in an optimum manner by using a dynamic program algorithm.

Another difficulty lies in establishing the acoustic templates representing the phonetic units to be located.

Normally, such templates are located by placing the phonetic units in a certain acoustic space and in determining for each of them the most representative domains.

The centers of the domains are then associated with corresponding phonetic units.

As there is a great deal of overlapping among the domains, (even for a single speaker and all the more for a large number of speakers), one generally assigns to a point in this acoustic space, a probability of being representative of a phonetic unit which is proportional to its distance from the center of the corresponding domain.

This supposes that the acoustic distance is directly connected to the perception distance between the sounds.

This is not too difficult to obtain for short distances, but unfortunately, an acoustic space with an associated distance in which this notion holds true for larger distances is not known at this time.

Thus, this solution requires finding, either better acoustic representations, or sufficient templates, so that this distance remains sufficiently limited.

Each of these conditions is as difficult to satisfy as the other.

A simple way to avoid this difficulty consists, according to this invention, in having any domain of the acoustic space being capable of representing several phonetic units.

Then, for each domain, the association probability to a phonetic unit is obtained during a training phase.

The domains can be defined on an acoustic base by methods for the creation of any number of domains.

Thus, these domains will constitute, in the acoustic space, a "grid" which is as fine as desired.

The maximum distance used for associating a point to a given domain and consequently to a number of phonetic units can be rendered as short as necessary.

With this technique, the need for an acoustic distance strictly related perception becomes much less critical than previously and there is avoided the need for establishing a number of precise templates for each phonetic unit.

Such a solution is obtainable at the price of a larger number of domains. However, this in turn considerably improves the performance of speaker independent speech recognition devices.

The invention will be better understood in the description which follows, which is presented only as an example, and in the following drawings, in which.

Figure 1:
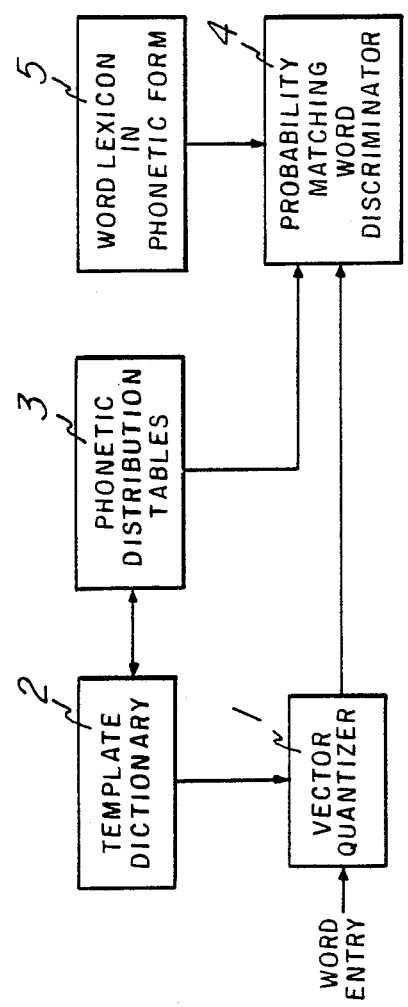
FIG. 1 is a simple diagram of the principle of a speaker independent word recognition system.

The apparatus of FIG. 1 includes a vector quantizer 1 which receives, on one of its inputs, the speech signal to be analyzed.

Another input to the vector quantizer is connected to memory 2 containing a dictionary of spectral templates to which is associated a group 3 of phonetic distribution tables associated with each template.

The output of quantizer 1 and the output of table group 3 are connected to the corresponding inputs of a probability matching word discriminating device 4 for determining the correspondence probability of words by dynamic programming.

This device is associated with memory 5 containing a lexicon of words in phonemic form.

The word signal is analyzed in the vector quantizer in which the acoustic parameters (here the cepstral coefficients obtained by a predictive linear algorithm) are calculated for each time interval of 10 to 20 ms and are compared with each template of the dictionary contained in memory 2 in utilizing the calculation of a distance, in this case the Euclidean distance, to find the closest neighbor.

The sequence of dictionary elements is then compared with each of the words of the word lexicon contained in memory 5 and stored in the form of a simple phonetic transcription.

In utilizing the association probability of the phonemes with the elements of the dictionary contained in the sequence, a dynamic program algorithm allows the calculation of the probability so that the sequence, to be identified corresponds to the phonetic chain of the lexicon.

The word having the highest probability is selected as the word to be identified if the probability has a value superior to a certain threshold.

The dynamic program algorithm allows the finding of the optimal path to establish the best correspondence for each word of the lexicon. This correspondence for each word of the lexicon. This correspondence is obtained with the probability matching word discriminator device 4.

Figure 2:
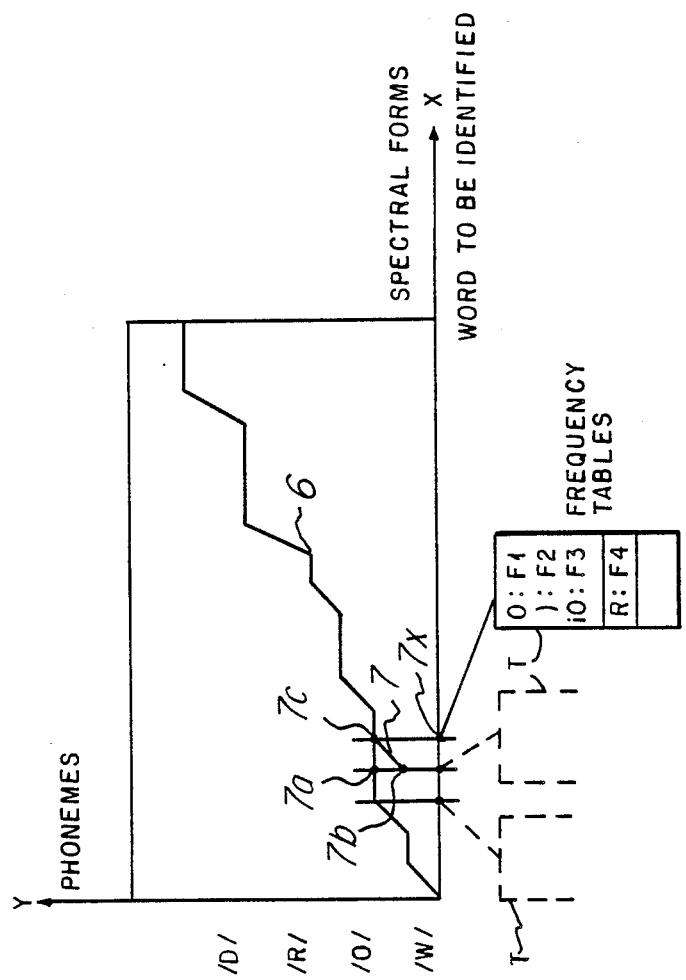
FIG. 2 is a graph showing a method for establishing a correspondance between a word to be identified and a lexicon word represented in its phonetic form.

This is illustrated by the graph of FIG. 2 in which the abcissa represents the word to be identified and the ordinant represents the phonemes.

The optimal path is represented by curve 6 while the grid of local constraints which must be taken into account for the correspondence is seen at 7.

It will be noted that this technique places no limitations on the number of templates associated with a given phoneme. However, neither the stable portion nor the transition of phoneme can be jumped.

A path 6 with a maximum adaption probability is determined by dynamic programming.

At each comparison step, the probability that an element (represented by a template on the x axis) is a part of a phoneme (on axis y) is found in the associated table T.

In order to arrive at the point indicated at 7c, a local constraint 7 forces the path 6 to evolve either from point 7a immediately to the left, to thus form a horizontal part of the path, or from point 7b located on the diagonal (precluding thus any vertical elongation of the path).

The probability of each of these is obtained by multiplying the probability of each of the paths terminating at 7a and 7b by the probability of point 7c as it is found in table T. In the example, the probability that element 7x is representative of phoneme O is F1.

The path selected to reach 7c is that of the maximal probability.

By proceeding in this manner for each possible point of the matrix, one arrives at path 6 of maximum probability.

The length of the horizontal path is not limited by the local constraint, but it can be limited in practice by using the statistical distribution of the length of each phoneme for involving, in the probability calculation, the fact that the association of an element of the sequence to a given phoneme is not independent of the preceding associations.

There will now be described, in connection with FIG. 3, the dictionary constitution and apprentice phase.

The dictionary of acoustical templates is established using a training group of phrases analyzed by linear predictive coding containing an equivalent number of phonemes and pronounced by a sufficiently large variety of speakers.

The selection of the reference templates can be effected in such a way that the dictionary provides the best representation of the training group according to a measurement of average distortion and for a given number of templates.

Figure 3:
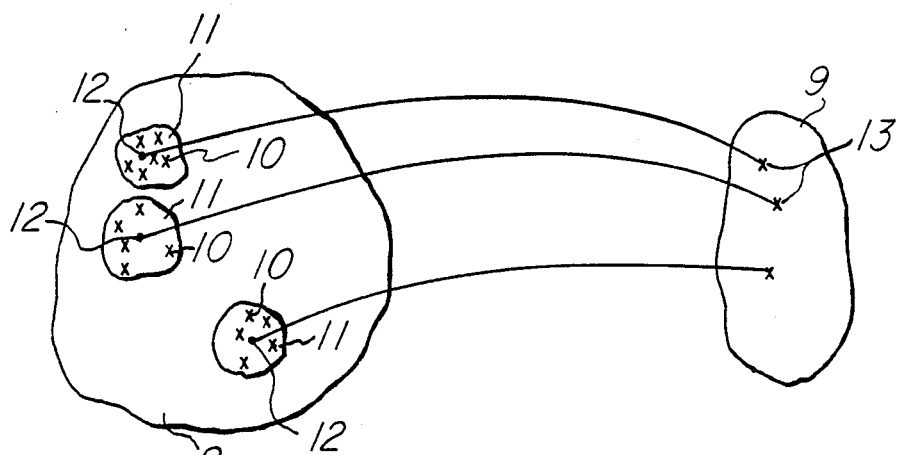
FIG. 3 illustrates the formation of a template dictionary for speech recognition independent of the speaker according to the invention.

FIG. 3 illustrates a selection method according to an algorithm of the dynamic groups. In this figure, there is represented training group 8 and spectral template dictionary 9; the operations are started by selecting, in the training group, spectral templates 10 having a distance, from their closest neighbor in the training group, which is greater than a certain threshold. The size of the proposed dictionary can be limited as desired by simply stopping its growing process.

Thereafter, all of the spectral templates of the training group are grouped into classes 11 as a function of their closest neighbor in the training group, after which the center of gravity 12 of each class 11 is selected as a template 13 for the template dictionary 9.

The same process is continued until the average distance is less than a certain threshold or until its variation has become less than a very small value, which indicates that the process has converged.

Thus the dictionary 9 of spectral templates 13 is the image of centers 12 of classes 11 of the spectral templates of the training group.

Figure 4:
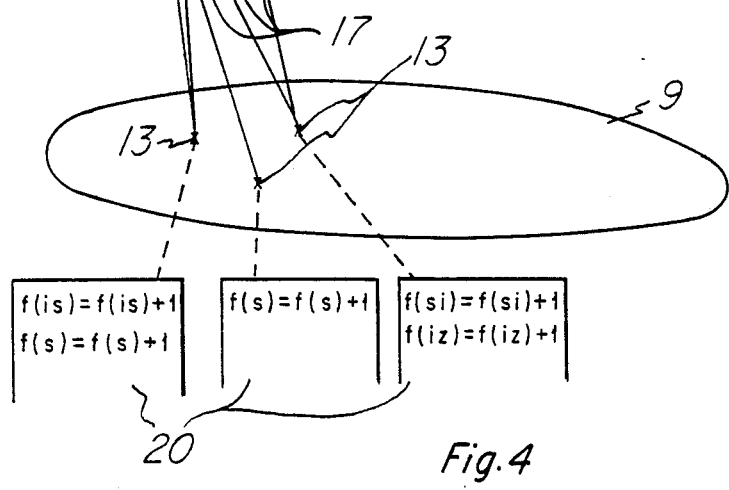
FIG. 4 shows the process of phonemic marking of the area from which is formed the template dictionary.

Line 14 of FIG. 4 illustrates the phonetic representation of a sentence.

Line 15 shows a manual segmentation into transitions and stable parts.

Line 16 represents the elements of the linear prediction codes which comprise respective speech data frames.

These code elements or LPC speech data frames 17 have corresponding elements 13 in the spectral template dictionary 9. These corresponding elements are obtained by vector coding using the spectral distance.

Finally, at the bottom of FIG. 4, there are represented phonetic distribution tables 20 associated with each spectral template. These tables correspond to tables T of FIG. 2 in the process of constitution.

These tables of phonetic frequencies are obtained by counting the number of appearances of phonemes in each class 11 (FIG. 3).

This supposes that the training group was segmented into phonemes and marked. For the first training group, this operation must be carried out completely by hand, but after a "sufficiently good" dictionary has been created, the recognition algorithm itself can be used to effect the automatic segmentation of other training terms, with only a manual verification.

The training phase operations will now be described with reference to FIGS. 5A and 5B.

Figure 5A:
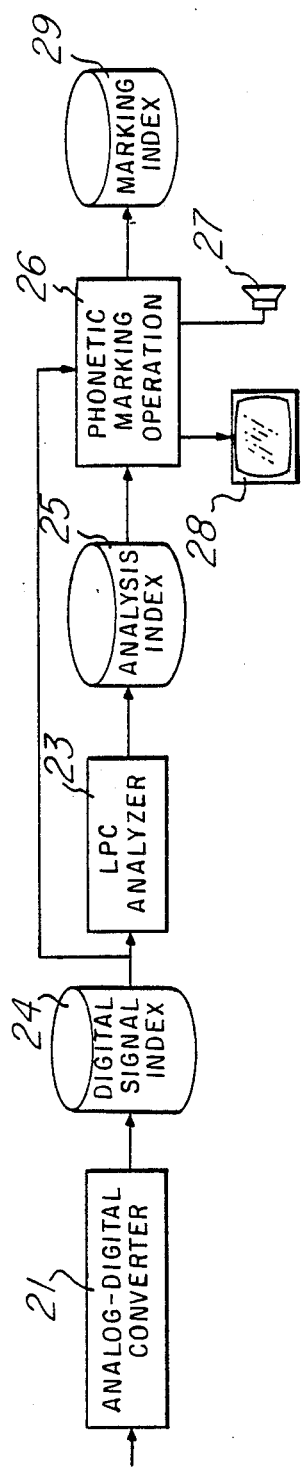
FIGS. 5A and 5B are diagrams of training means for speaker independent speech recognition according to the invention.

FIG. 5A shows the operations for constituting a marking index.

These operations include the analog to digital conversion, in 21, of the training group speech, and its analysis by linear prediction, at 23. The digital signal is stored in index 24.

Figure 6:
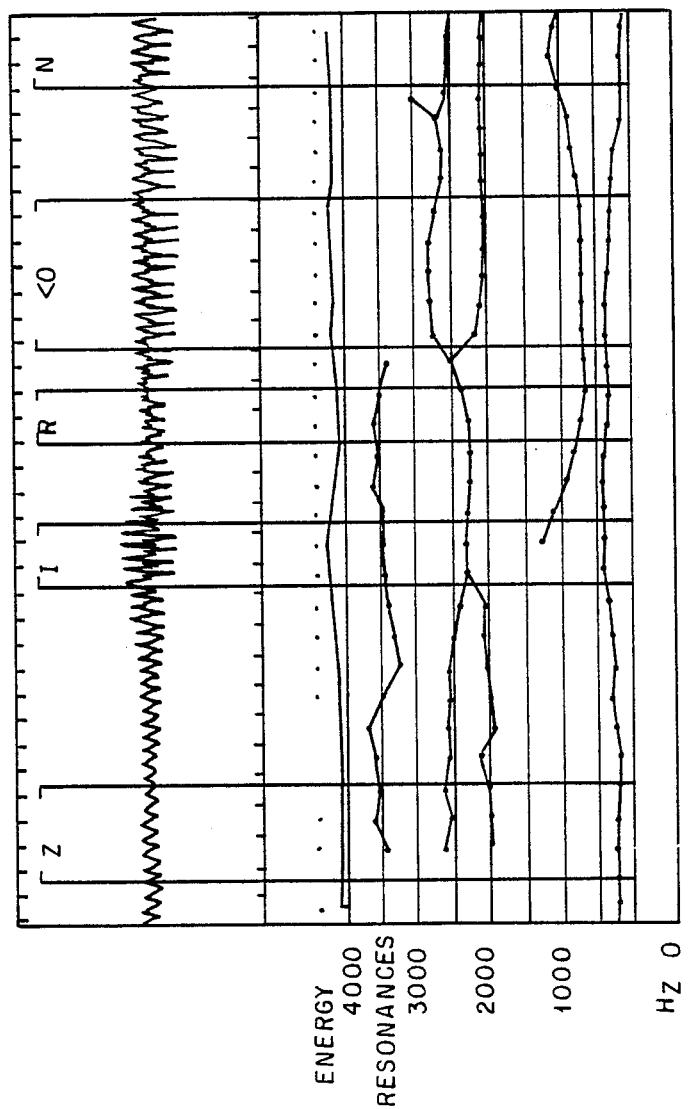
FIG. 6 is a graphical representation of the analyzed signal and the parameters which constitute it as well as its phonemic marking.

The results of the analysis are introduced into analysis index 25 and then there is effected a phonetic marking operation at 26 with sound emission at 27 and a graphical representation at 28, which is seen in FIG. 6, and the results are stored in marking index 29. In effecting the phonetic marking operation at 26, the digital signal from the digital signal index 24 is provided as an independent input to be combined with the results of the linear prediction analysis from the analysis index 25 in the phonetic marking operation 26.

Figure 5B:
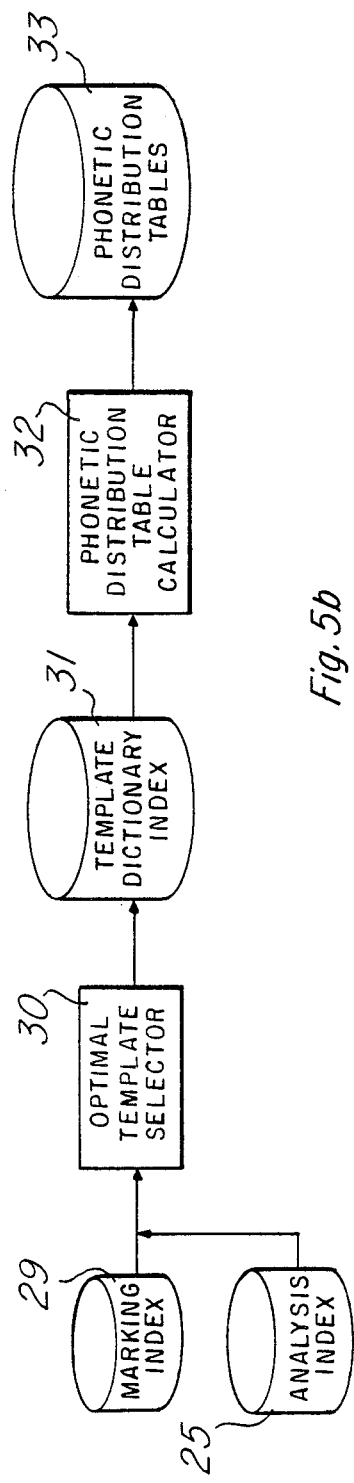

As seen in FIG. 5B, the phonetic marks in marking index 29 are combined at 30 with the data of analysis index 25 during an operation of optimal selection of spectral templates.

The results of this selection are transferred to dictionary index 31. The association frequency between the phonemes and the dictionary elements are calculated in 32 to form the distribution tables at 33.

The method effected in FIGS. 5A and 5B requires a specific program of phonetic detection.

It includes an audio-graphical reaction with a group of very flexible instructions which renders the segmentation as precise as possible and also as rapid and easy as possible. A technique for accomplishing segmentation in achieving phonetic detection is generally described in the publication "Application de la Distinction Trait-Indice-Propriete a la Construction D'un Logiciel Pour la Synthese" (Application of the Distinction Between Features/Indices/Properties to Speech Synthesis) - Gerard Benbassat and Xavier Delon, *Speech Communication* 2, pp. 141-144 (Mar. 1983).

The graphical representation of FIG. 6 represents the wave form as well as the frequencies and band widths, energy and fundamental frequency as a function of time.

The program produces a marking index having the name of the phonemes and their limits as well as certain information relating to acoustic indexes.

Another group of programs uses marking index 29 and analysis index 25 (FIG. 5A) produced by an analysis operation by linear prediction coding to constitute the template dictionary according to the algorithm described above and the associated phonetic frequencies.

The output programs sort the results and present them in the form of histograms.

The group of training phrases reproduced below in the English language as an example were selected from the French language to contain a phoneme distribution such that the calculated probabilities are not displaced.

TRAINING GROUP

Two lists of ten phrases each have been selected from the French language in such a manner that the number of appearances of each phoneme is distributed in a regular manner (an average of 16 times each).

LIST 1

1-Did the driver stop the auto?
2-It's been like that for ten years, you know?
3-This horse can walk step by step.
4-Beer is less strong than rum.
5-It's always very cold here in winter.
6-I love Sylivie when she is cute.
7-Diane will not return before Monday.
8-Do you like drawing?
9-I've already read the response he sent me by mail.
10-My gloves are worn.

LIST 2

1-What do we want for lunch on Monday?
2-Let's make our choice quickly, these are good things, let's spoil ourselves.
3-We are going to dance together tomorrow, I would like bread, wine, cheese, and cake.
4-Fernand loves to see lights dancing in the forest when it is warm out.
5-You can talk some more, we can do nothing for you, it's the law, you know.
6-Guy has just lost a glove, leg warmer, hat, head band, glasses, socks, and now he is shivering.
7-These candies are good, we want some more Uncle Jean.
8-Make your dog, cat, horse, hurry up, what slow-pokes.
9-A happy baby plays and then eats its formula.
10-Chirp-chirp said the tired bird falling into the well.

These phrases (in the original French language) have a total of 568 phonemes and about 63000 elements of 10 ms.

Speakers, men and women, with accents and tones which differ, were selected to register these phrases.

Below is an example of the elements for the recognition system of FIG. 1 and the training means of FIGS. 5A and 5B.

| Recognition system of FIG. 1 | |
|---|---|
| Reference N° | Nature of Element |
| 1 | A/D Converter + TMS 320 Microprocesser |
| 2 | ROM Memory of about 32 to 64 Kbits |
| 3 | ROM Memory of about 16 Kbits |
| 4 | Standard microprocessor e.g. TMS 7000, Texas Instruments. |
| 5 | RAM or EPROM Memory |
| Training means of FIGS. 5A and 5B | |
| Reference N° | Nature of element |
| 21 | A/D Converter |
| 23,26,30,32 | Mini-Computers DS 990-12. Texas Inst., properly programmed |
| 24,25,29 | RAM Memory, Magnetic memories |
| 31,33 | Magnetic memories |

What is claimed:

1. A speaker independent speech recognition method comprising:

analyzing an input analog speech signal;

dividing the analyzed speech signal into phonetic units;

comparing said phonetic units of the analyzed speech signal with a plurality of reference templates as stored in a phoneme dictionary, wherein each reference template is representative of at least a portion of a phoneme and is prepared in a training phase by dividing an acoustical space representing phonetic units spoken during training into domains, each of the domains of the acoustical space representing a plurality of phonetic units;

providing phonetic distribution tables associated with each of said reference templates stored in said phoneme dictionary as frequency tables, the probability of a particular phonetic unit being included in a domain being defined according to said frequency tables;

comparing a sequence of phonetic units of the analyzed speech signal with a plurality of words stored in a word lexicon in a phonetic form in accordance with said frequency tables; and recognizing a particular word of the speech to be recognized as corresponding to a word stored in said word lexicon and having the maximum probability of its constituent phonetic units according to said frequency tables.

2. A speaker independent speech recognition method as set forth in claim 1, wherein the maximum distance utilized for associating a point with a domain included in an acoustical space and consequently to a certain number of phonetic units is restricted to as short a distance as necessary by the choice of the number of sufficiently large domains.

3. A speaker independent speech recognition method as set forth in claim 1 wherein the input analog speech signal is analyzed in a vector quantizer to provide acoustic parameters, and the acoustic parameters are calculated for each interval of time of a predetermined value and are compared with each reference template stored in said phoneme dictionary utilizing a distance calculation.

4. A speaker independent speech recognition method as set forth in claim 3, wherein said distance calculation is a calculation of Euclidean distance.

5. A speaker independent speech recognition method as set forth in claim 3, wherein the calculation of the probability according to said frequency tables of correspondence between the sequence of acoustic parameters obtained at the output of the vector quantizer and each word stored in said word lexicon is accomplished by dynamic programming.

6. A speaker independent speech recognition method as set forth in claim 1, wherein said phoneme dictionary is derived by selecting spectral templates in a training set of spectral templates such that the distance from their closest neighbor is of larger magnitude than a threshold value;

grouping the spectral templates of the training set into classes as a function of their nearest neighbor in the training set of spectral templates; and providing said phoneme dictionary by inserting into a proposed dictionary of spectral templates the center of gravity of each class of spectral templates from the training set of spectral templates as a respective reference template; and repeating the sequence of steps beginning with the selection of spectral templates in a training set, grouping the spectral templates of the training set into classes, and inserting into the proposed dictionary of spectral templates the center of gravity of each class of spectral templates until the average distance between respective spectral templates closest to each other is less than a certain threshold distance or until the variation in the average distance becomes lower than a reference value of low magnitude.

7. A speaker independent speech recognition method as set forth in claim 1, wherein the training phase includes creating an analysis index and a marking index from the speech of a training set of words as spoken by a predetermined number of speakers having different accents and tones as converted into digital speech signals; and creating frequency tables from the analysis index and the marking index.

8. A speaker independent speech recognition method as set forth in claim 7, further including coding the digital speech signals obtained from the conversion of the speech of the training set; and analyzing the digital signals by linear prediction analysis to provide speech parameters comprising the contents of the analysis index; and submitting the speech parameters stored in said analysis index to a phonetic marking operation to form the speech data stored in said marking index.

9. A speaker independent speech recognition method as set forth in claim 8, wherein said phonetic marking operation is achieved by utilizing a sound emission monitor and a spectral and temporal graphic representation of the digital speech signal from the training set simultaneously so as to determine the limits of the stable portions of the phonemes.

10. A speaker independent speech recognition method as set forth in claim 7, wherein the frequency tables are provided by performing optimal selection of the spectral templates from the contents of the analysis and marking indexes;

placing the optimally selected spectral templates in a dictionary index; and calculating the frequencies to be included in the frequency tables from the contents of the dictionary index.

* * * * *